United States Patent
Yamagishi et al.

(10) Patent No.: US 7,280,298 B2
(45) Date of Patent: Oct. 9, 2007

(54) THIN FILM MAGNETIC HEAD FIT TO RECORDATION OF HIGHER FREQUENCY

(75) Inventors: Michinaga Yamagishi, Kawasaki (JP); Takenori Ohshima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/636,363

(22) Filed: Aug. 7, 2003

(65) Prior Publication Data

US 2004/0027711 A1    Feb. 12, 2004

(30) Foreign Application Priority Data

Aug. 9, 2002    (JP) .............................. 2002-232443

(51) Int. Cl.
  *G11B 15/12*   (2006.01)
  *G11B 5/17*    (2006.01)
(52) U.S. Cl. .......................... 360/63; 360/75; 360/123
(58) Field of Classification Search .................. 360/61, 360/62, 68, 125–127, 123
See application file for complete search history.

(56) References Cited

U.S. PATENT DOCUMENTS

| | | | |
|---|---|---|---|
| 4,685,014 A * | 8/1987 | Hanazono et al. | 360/126 |
| 5,689,478 A * | 11/1997 | Ishii et al. | 369/13.17 |
| 5,734,534 A * | 3/1998 | Yamamoto et al. | 360/123 |
| 5,764,451 A * | 6/1998 | Katz | 360/123 |
| 5,831,426 A * | 11/1998 | Black et al. | 324/127 |
| 5,835,313 A * | 11/1998 | Sato et al. | 360/317 |
| 5,875,080 A * | 2/1999 | Seagle | 360/123 |
| 5,910,861 A * | 6/1999 | Ahn | 360/46 |
| 6,104,562 A * | 8/2000 | Ottesen et al. | 360/63 |
| 6,191,917 B1 * | 2/2001 | Dee et al. | 360/126 |
| 6,204,997 B1 * | 3/2001 | Sasaki | 360/123 |
| 6,252,390 B1 * | 6/2001 | Black et al. | 324/127 |

(Continued)

FOREIGN PATENT DOCUMENTS

JP          55-117719        9/1980

(Continued)

OTHER PUBLICATIONS

Electronic translation of JP 05-225501.*

*Primary Examiner*—Andrea Wellington
*Assistant Examiner*—Dismery Mercedes
(74) *Attorney, Agent, or Firm*—Greer, Burns & Crain, Ltd.

(57) ABSTRACT

A set of coils wind around a magnetic core in a thin film magnetic head. Current supplying circuits are separately connected to the individual coils. The individual coils get shorter in the overall length as compared with the case where a set of coils consist of a single conductor. The impedance of the coils can be reduced. The reduction in the impedance enables the flow of the electric current to be established in a moment within the coils. The magnetic field of a sufficient intensity can be generated in a moment. Magnetization of a sufficient intensity can thus be established on a magnetic recording medium even when the frequency of a signal for recordation gets higher.

12 Claims, 7 Drawing Sheets

U.S. PATENT DOCUMENTS

| | | | |
|---|---|---|---|
| 6,563,674 B1 * | 5/2003 | Honda | 360/234.5 |
| 6,717,770 B1 * | 4/2004 | Crawford | 360/125 |
| 2002/0021521 A1 * | 2/2002 | Kitahori et al. | 360/66 |
| 2002/0021528 A1 * | 2/2002 | Kamijima | 360/123 |
| 2004/0051996 A1 * | 3/2004 | Kautzky et al. | 360/123 |
| 2004/0051998 A1 * | 3/2004 | Sato | 360/126 |
| 2004/0070871 A1 * | 4/2004 | Ogawa et al. | 360/126 |

FOREIGN PATENT DOCUMENTS

| | | | |
|---|---|---|---|
| JP | 2-244412 | | 9/1990 |
| JP | 04-362505 | | 12/1992 |
| JP | 5-225501 | * | 9/1993 |
| JP | 05225501 A | * | 9/1993 |
| JP | 2002-025011 | | 1/2002 |

* cited by examiner

THIN FILM MAGNETIC HEAD FIT TO RECORDATION OF HIGHER FREQUENCY

BACKGROUND OF THE INVENTION

1. Field of the Invention

The present invention relates to a thin film magnetic head in general incorporated within a magnetic recording device or storage system such as a hard disk drive (HDD). The thin film magnetic head is usually designed to write magnetic data into a magnetic recording medium in the magnetic recording device.

2. Description of the Prior Art

A thin film magnetic head is often utilized to write magnetic binary data into a magnetic recording medium. The thin film magnetic head includes a thin film coil pattern winding around a magnetic core. When an electric current is supplied to the thin film coil pattern, a magnetic flux runs through the magnetic core.

The thin film magnetic head is, for example, mounted on a head slider incorporated in a magnetic storage system. The head slider opposes its medium-opposed or bottom surface to a magnetic recording medium such as a magnetic recording disk, for example. The tip ends of the magnetic core, namely, upper and lower magnetic poles face each other at the bottom surface of the head slider. A non-magnetic gap layer is interposed between the upper and lower magnetic poles at the bottom surface. The gap layer serves to leak the magnetic flux out of the bottom surface. The leaked magnetic flux generates a magnetic field for recordation. When this magnetic field is applied to the magnetic recording medium, magnetic bit data can be written into the magnetic recording medium.

In general, the thin film coil pattern consists of a single swirly conductive pattern. As the number of wind gets larger, the overall length of the swirly conductive pattern gets longer. The impedance of the swirly conductive pattern thus increases. A larger impedance leads to a mild rise of a magnetic field for recordation. A magnetic field of a sufficient intensity cannot be generated in a moment. As the frequency of a signal for recordation gets higher, the magnetic field for recordation will suffer from a smaller intensity. Magnetization of a sufficient intensity cannot be established on the magnetic recording medium.

SUMMARY OF THE INVENTION

It is accordingly an object of the present invention to provide a thin film magnetic head greatly contributing to establishment of magnetization of a sufficient intensity on a magnetic recording medium even when the frequency of a signal for recordation gets higher.

According to the present invention, there is provided a thin film magnetic head comprising: coils winding around a magnetic core; and one or more current supplying circuits connected to the coils so as to supply the coils with an electric current for recordation.

The thin film magnetic head allows the individual coils to get shorter in the overall length as compared with the case where all the coils consist of a single conductor. The impedance of the coils can be reduced. On the other hand, if the total number of winds of the coils are set equal to the number of wind of the single coil, a magnetic field of a sufficient intensity can be obtained for a set of coils. In addition, if the coils individually receive the electric current for recordation from the current supplying circuits, respectively, the flow of the electric current can be established in a moment within the coils as compared with the case where the longer single coil receives the electric current. Accordingly, the flow of the magnetic flux can be generated within the magnetic core immediately after the inversion of the electric current has occurred. The magnetic field for recordation cannot suffer from a mild rise. The magnetic field of a sufficient intensity can be generated in a moment. Magnetization of a sufficient intensity can thus be established on a magnetic recording medium even when the frequency of a signal for recordation gets higher. This is expected to contribute to improvement in the recording density of the magnetic recording medium.

Each one of the coils may be connected to a corresponding one of the current supplying circuits in the thin film magnetic head. Alternatively, the current supplying circuit may commonly be connected to a group of the coils. Any number of wind may be established in the individual coils. The number of wind may separately be set in the coils.

A selector circuit may commonly be connected to the current supplying circuits. The selector circuit may be designed to selectively supply at least one of the current supplying circuits with data signals. In general, the intensity of a magnetic flux generated within a magnetic core depends upon the space between the coils and the magnetic core. The coil closer to the magnetic core acts on the magnetic core in a stronger manner. If the electric current can selectively be supplied to the coils in this manner, the intensity of the magnetic flux can be adjusted as expected within the magnetic core in a facilitated manner.

In general, a coil is made of a thin film pattern in the thin film magnetic head. The coil remoter from the magnetic core will suffer from a larger overall length of the conductive pattern. It is presumed that the thin film coils suffer from a time lag in the rise of the magnetic field. The thin film coil remoter from the magnetic core may suffer from a relatively mild rise of the magnetic field. If the electric current can selectively be supplied to the thin film coils, the rise of the magnetic flux can be adjusted as expected within the magnetic core in a facilitated manner.

A determination circuit may also be connected to the selector circuit. The determination circuit may be designed to supply the selector circuit with an instruction signal identifying a selected one or selected ones of the current supplying circuits based on a read signal read out of a magnetic recording medium. The determination circuit contributes to adjustment of the magnetic field at the thin film magnetic head based on the read signal. The intensity of the magnetic flux as well as the timing of the rise of the magnetic flux can be adjusted in the coils at a still higher accuracy based on the output level of the read signal.

Otherwise, a current value controlling circuit may be connected to the current supplying circuits. The current value controlling circuit may be designed to adjust the current value of the electric current. The thus adjusted electric current can be supplied to the coils. If the value of the electric current can individually be set for the coils, the intensity of the magnetic field can be adjusted as expected within the coils. Here, the current value controlling circuit may likewise receive connection of a determination circuit. The determination circuit may be designed to instruct the current value controlling circuit to set the current value based on the read signal.

The above-described thin film magnetic head may be incorporated within a magnetic recording device or storage system, for example. The magnetic recording device may comprise: a magnetic recording medium; and a head slider facing the magnetic recording medium. The aforementioned coils may be mounted on the head slider. The magnetic recording device may include one utilizing a magnetic recording medium such as a magnetic recording disk or tape. A hard disk drive may represent the magnetic recording device.

BRIEF DESCRIPTION OF THE DRAWINGS

The above and other objects, features and advantages of the present invention will become apparent from the following description of the preferred embodiments in conjunction with the accompanying drawings, wherein.

DESCRIPTION OF THE PREFERRED EMBODIMENTS

Figure 1:
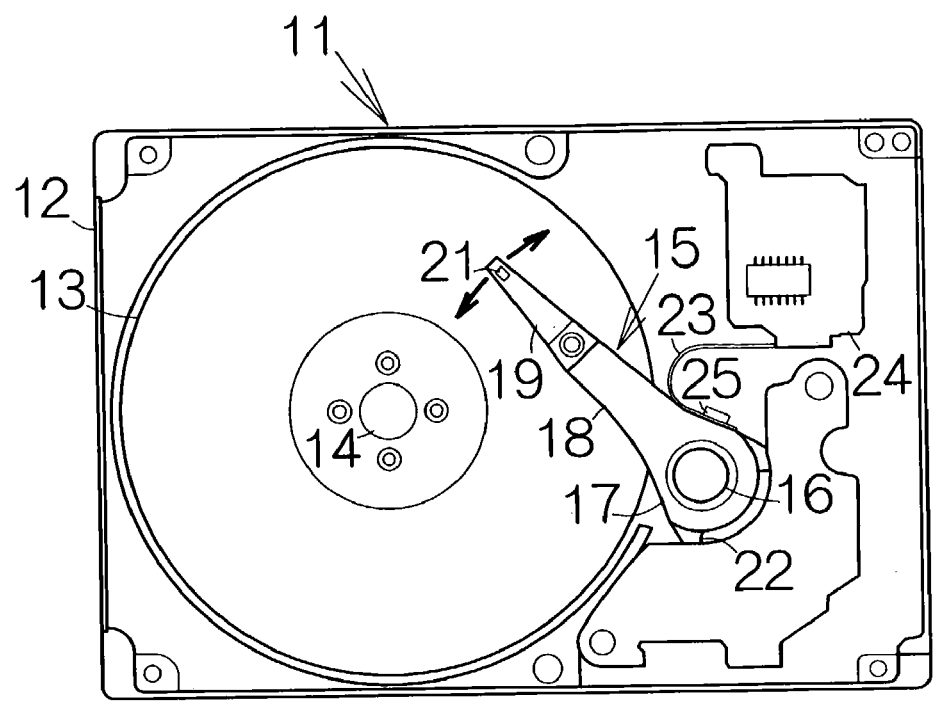
FIG. 1 is a plan view schematically illustrating the inner structure of a hard disk drive (HDD) as an example of a magnetic recording device.

FIG. 1 schematically illustrates the inner structure of a hard disk drive (HDD) 11 as an example of a magnetic recording device or storage system. The HDD 11 includes a box-shaped main enclosure 12 defining an inner space of a flat parallelepiped, for example. At least one magnetic recording disk 13 is incorporated in the inner space within the main enclosure 12. The magnetic recording disk 13 is mounted on the driving shaft of a spindle motor 14. The spindle motor 14 is allowed to drive the magnetic recording disk 13 for rotation at a higher revolution speed such as 7,200 rpm or 10,000 rpm, for example. A cover, not shown, is coupled to the main enclosure 12 so as to define the closed inner space between the main enclosure 12 and itself.

A head actuator 15 is also incorporated within the inner space of the main enclosure 12. The head actuator 15 includes an actuator block 17 supported on a vertical support shaft 16 for rotation. Rigid actuator arms 18 are defined in the actuator block 17. The actuator arms 18 are designed to extend in a horizontal direction from the vertical support shaft 16. The actuator arms 18 are associated with the front and back surfaces of the magnetic recording disk or disks 13, respectively. The actuator block 17 may be made of aluminum. Molding process may be employed to form the actuator block 17.

Elastic head suspensions 19 are fixed to the tip ends of the actuator arms 18. The individual head suspension 19 is designed to extend forward from the corresponding tip end of the actuator arm 18. As conventionally known, a flying head slider 21 is supported on the front end of the individual head suspension 19. The flying head sliders 21 are opposed to the surfaces of the magnetic recording disk or disks 13.

The head suspension 19 serves to urge the flying head slider 21 toward the surface of the magnetic recording disk 13. When the magnetic recording disk 13 rotates, the flying head slider 21 is allowed to receive airflow generated along the rotating magnetic recording disk 13. The airflow serves to generate a lift on the flying head slider 21. The flying head slider 21 is thus allowed to keep flying above the surface of the magnetic recording disk 13 during the rotation of the magnetic recording disk 13 at a higher stability established by the balance between the lift and the urging force of the head suspension 19.

A power source 22 such as a voice coil motor (VCM) is connected to the tail of the actuator block 17. The power source 22 drives the actuator block 17 for rotation around the support shaft 16. The rotation of the actuator block 17 induces the swinging movement of the actuator arms 18 and the head suspensions 19. When the actuator arm 18 is driven to swing about the support shaft 16 during the flight of the flying head slider 21, the flying head slider 21 is allowed to cross the recording tracks defined on the magnetic recording disk 13 in the radial direction of the magnetic recording disk 13. This radial movement serves to position the flying head slider 21 right above a target recording track on the magnetic recording disk 13. As conventionally known, in the case where two or more magnetic recording disks 13 are incorporated within the inner space of the main enclosure 12, a pair of the elastic head suspensions 19 and the actuator arms 18 are disposed between the adjacent magnetic recording disks 13.

A flexible printed circuit board 23 is also incorporated within the inner space of the main enclosure 12. The end of the flexible printed circuit board 23 is received on the surface of the actuator block 17. The other end of the flexible printed circuit board 23 is connected to a circuit board 24 likewise incorporated within the inner space of the main enclosure 12. The circuit board 24 is electrically connected to a printed circuit board, not shown, attached to the back surface of the main enclosure 12, for example. The circuit board 24 and a controller circuit or HDD controller established on the printed circuit board serve to manage the operation of the HDD 11. The controller circuit may comprise a microprocessor unit (MPU), a digital signal processing circuit (DSP), or the like.

A head IC chip 25 is mounted on the surface of the flexible printed circuit board 23. The head IC chip 25 is electrically connected to a read/write electromagnetic transducer on the flying head slider 21. A conductive wiring pattern, not shown, extending over the surface of the head suspension 19 is utilized to establish the electric connection. The read/write electromagnetic transducer will be described later in detail.

Figure 2:
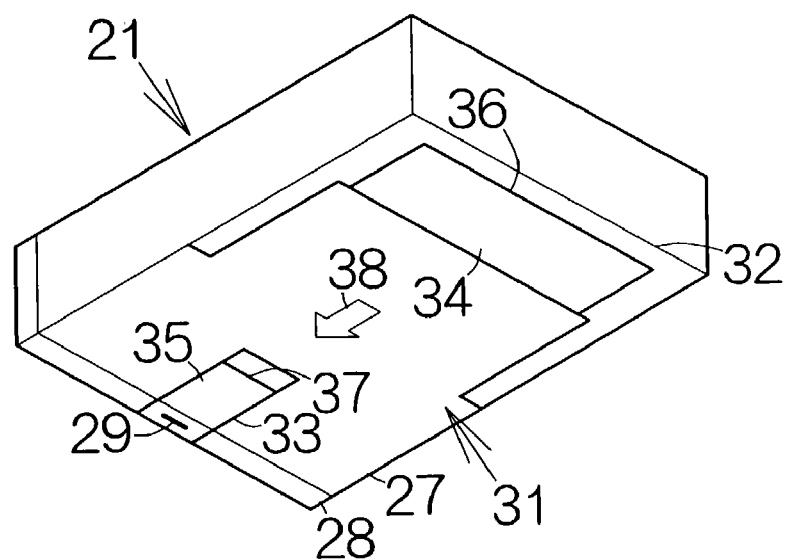
FIG. 2 is an enlarged perspective view of a flying head slider according to a specific example.

FIG. 2 illustrates a specific example of the flying head slider 21. The flying head slider 21 includes a slider body 27 made of $Al_2O_3$—TiC in the form of a flat parallelepiped. A head protection layer 28 made of $Al_2O_3$ (alumina) is coupled to the outflow or trailing end of the slider body 27. The read/write electromagnetic transducer 29 is contained within the head protection layer 28. A medium-opposed surface or bottom surface 31 is defined over the slider body 27 and the head protection layer 28 so as to face the magnetic recording disk 13 at a distance.

A front rail 32 and a rear rail 33 are formed on the bottom surface 31. The front rail 32 is designed to extend along the inflow or leading end of the slider body 27. The rear rail 33 is located near the outflow or trailing end of the slider body 27. Air bearing surfaces (ABSs) 34, 35 are respectively defined on the top surfaces of the front and rear rails 32, 33. The inflow ends of the air bearing surfaces 34, 35 are connected to the top surfaces of the front and rear rails 32, 33 through steps 36, 37, respectively. The read/write electromagnetic transducer 29 exposes the tip or front end at the air bearing surface 35. It should be noted that the front end of the read/write electromagnetic transducer 29 may be covered with a protection layer, made of diamond-like-carbon (DLC), extending over the air bearing surface 35.

The bottom surface 31 of the flying head slider 21 is designed to receive airflow 38 generated along the rotating magnetic recording disk 13. The steps 36, 37 serve to generate a relatively larger positive pressure or lift at the air bearing surfaces 34, 35. Moreover, a larger negative pressure is induced behind the front rail 32. The negative pressure is balanced with the lift so as to stably establish a flying attitude of the flying head slider 21. The flying head slider 21 may take any shape or form other than the aforementioned one.

Figure 3:
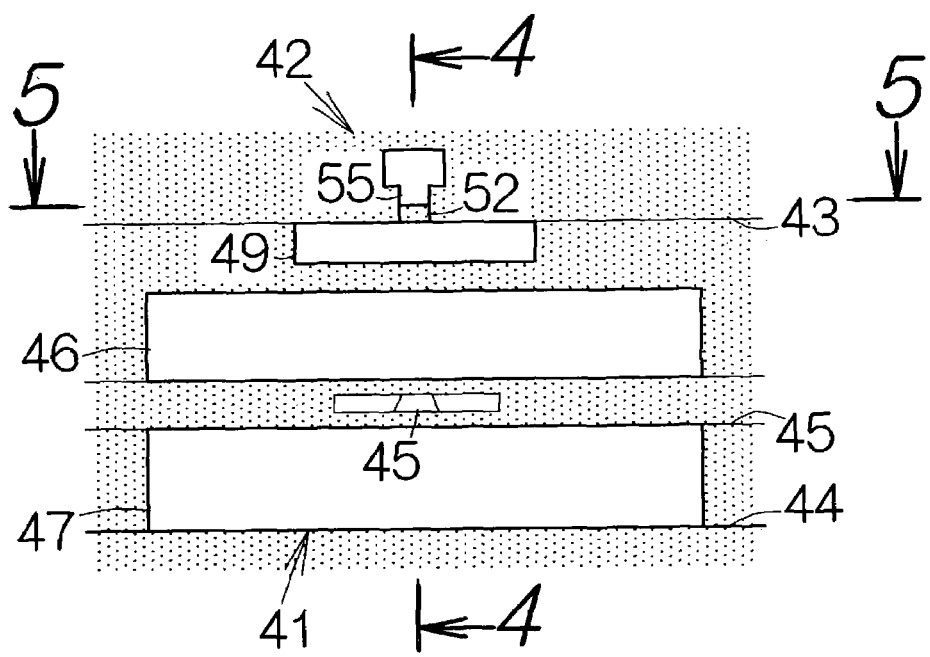
FIG. 3 is an enlarged front view of a read/write electromagnetic transducer observed at a medium-opposed surface or an air bearing surface (ABS)

As shown in FIG. 3, the read/write electromagnetic transducer 29 includes a read head element 41 and an inductive write head element or thin film magnetic head 42. A magneto resistive (MR) element such as a giant magneto resistive (GMR) element and a tunnel-junction magneto resistive (TMR) element may be employed as the read head element 41. The read head element 41 is usually allowed to induce variation in the electric resistance in response to the inversion of polarization in the applied magnetic field from the magnetic recording disk 13. This variation in the electric resistance is utilized to detect binary data. On the other hand, the thin film magnetic head 42 allows thin film coils to generate a magnetic field in response to supply of an electric current as described later in detail. The generated magnetic field is utilized to record binary data into the magnetic recording disk 13. The read head element 41 and the thin film magnetic head 42 are interposed between an overcoat film 43 and an undercoat film 44, both made of $Al_2O_3$ (alumina). The overcoat film 43 corresponds to the upper half of the aforementioned head protection layer 28, while the undercoat film 44 corresponds to the lower half of the head protection layer 28.

The read head element 41 includes a magneto resistive film 45, such as a spin valve film or a tunnel-junction film, interposed between upper and lower shield layers 46, 47. The shield layers 46, 47 may be made of a magnetic material such as FeN and NiFe. A linear resolution of magnetic recordation can be determined on the magnetic recording disk 13 along the recording track based on the space between the upper and lower shield layers 46, 47.

Figure 4:
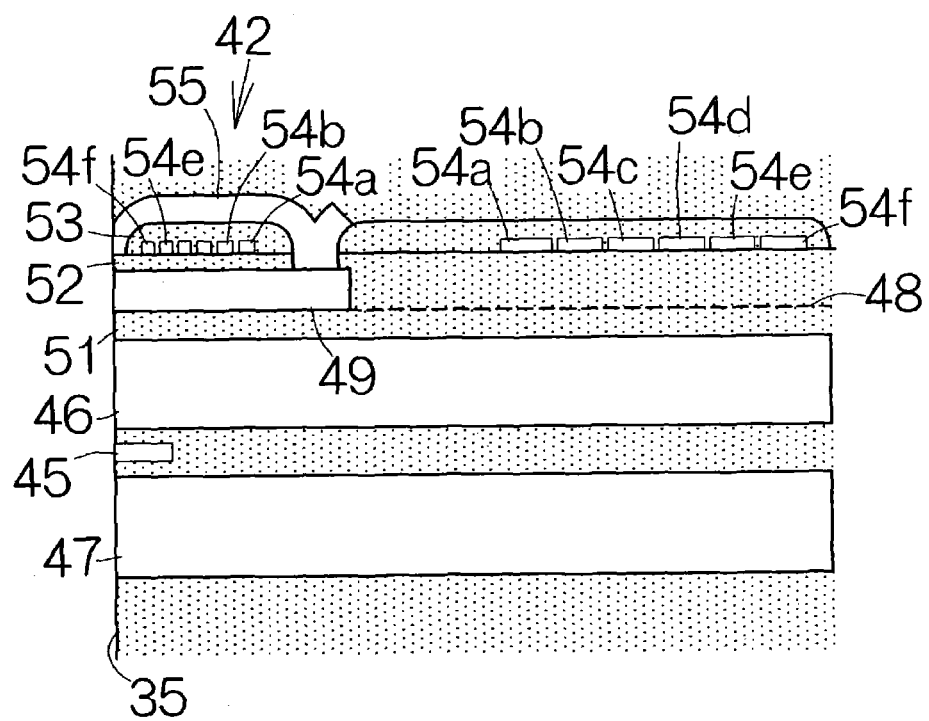
FIG. 4 is a vertical sectional view taken along the line 4-4 in FIG. 3.

As shown in FIG. 4, the thin film magnetic head 42 according to a first embodiment of the present invention includes a lower magnetic pole layer 49 extending along a datum plane 48 over the upper shield layer 46. The datum plane 48 is defined over the surface of a non-magnetic layer 51, made of $Al_2O_3$, for example. The non-magnetic layer 51 extends over the upper shield layer 46 by a constant thickness. The non-magnetic layer 51 serves to magnetically isolate the upper shield layer 46 and the lower magnetic pole layer 49. The lower magnetic pole layer 49 may be made of FeN, NiFe, or the like.

A non-magnetic gap layer 52 is overlaid on the lower magnetic pole layer 49. Thin film coils 54a, 54b, ..., are formed over the non-magnetic gap layer 52. The thin film coils 54a, 54b, ..., are embedded within an insulating layer 53. An upper magnetic pole layer 55 is overlaid on the upper surface of the insulating layer 53. The upper magnetic pole layer 55 may be made of FeN, NiFe, or the like. The rear end of the upper magnetic pole layer 55 is magnetically coupled with the rear end of the lower magnetic pole layer 49 at the central area of the thin film coils 54a, 54b, .... The upper and lower magnetic pole layers 55, 49 cooperate with each other to establish a magnetic core penetrating through the central area of the thin film coils 54a, 54b, ..., in this manner.

The front end of the upper magnetic pole layer 55 gets exposed at the air bearing surface 35. Likewise, the front end of the lower magnetic pole layer 49 gets exposed at the air bearing surface 35. The non-magnetic gap layer 52 is interposed between the upper and lower magnetic pole layers 55, 49 at the air bearing surface 35. A write gap is established in this manner. The non-magnetic gap layer 52 serves to leak the magnetic flux running through the magnetic core out of the air bearing surface 35 between the front ends of the upper and lower magnetic pole layers 55, 49. The leaked magnetic flux forms a magnetic field for recordation. In addition, a tiny lower auxiliary magnetic pole piece and/or a tiny upper auxiliary magnetic pole piece may be disposed between the lower and upper magnetic pole layers 49, 55. The lower auxiliary magnetic pole piece may stand from the upper surface of the lower magnetic pole layer 49 toward the upper magnetic pole layer 55. The upper auxiliary magnetic pole piece likewise may stand from the lower surface of the upper magnetic pole layer 55 toward the lower magnetic pole layer 49. These upper and lower auxiliary magnetic pole pieces serve to establish a smaller or narrower write gap as compared with the case where the upper magnetic pole layer 55 is simply opposed to the lower magnetic pole layer 49. A non-magnetic material such as $Al_2O_3$ may be filled up between the surface of the lower magnetic pole layer 49 and the non-magnetic gap layer 52.

Figure 5:
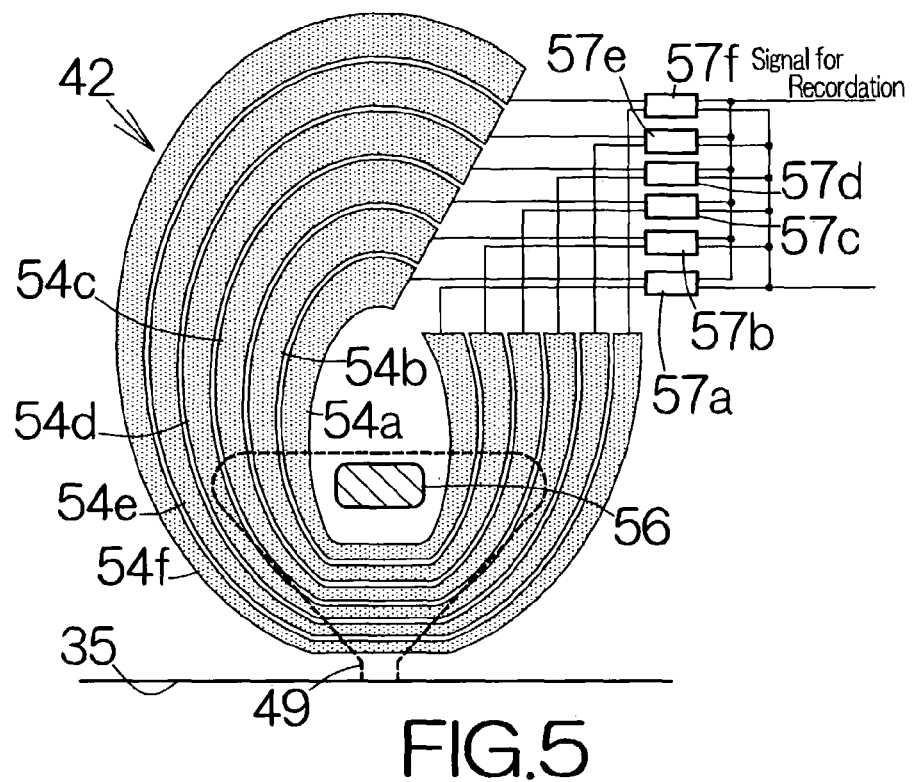
FIG. 5 is an enlarged plan view, corresponding to a horizontal sectional view taken along the line 5-5 in FIG. 3, schematically illustrating the structure of a thin film magnetic head according to a first embodiment of the present invention.

As shown in FIG. 5, the individual thin film coils 54a, 54b, ..., wind around a magnetic piece 56, a part of the magnetic core, standing from the upper surface of the lower magnetic pole layer 49. Any number of wind may be established in the individual thin film coils 54a, 54b, .... Current supplying circuits 57a, 57b, ..., are individually connected to the thin film coils 54a, 54b .... The current supplying circuits 57a, 57b, ..., may be established within the head IC chip 25. The individual current supplying circuits 57a, 57b, . . . , are designed to receive an instruction signal for recordation or a data signal from the HDD controller, for example. The current supplying circuits 57a, 57b, . . . , individually output an electric current for recordation based on the instruction signal for recordation. The electric current for recordation is individually supplied to the thin film coils 54a, 54b, . . . .

The thin film magnetic head 42 allows the individual thin film coils 54a, 54b, . . . , to get shorter in the overall length as compared with the case where all the thin film coils 54a, 54b, . . . , consist of a single swirly conductive pattern. The impedance of the individual thin film coils 54a, 54b, . . . , can be reduced. Since the thin film coils 54a, 54b, . . . , individually receive the electric current for recordation from the separate current supplying circuits 57a, 57b, . . . , the flow of the electric current can be established in a moment within the thin film coils 54a, 54b, . . . , as compared with the case where a single current supplying circuit is connected to a single swirly coil pattern. Accordingly, the flow of the magnetic flux can be generated within the magnetic core immediately after the inversion of the electric current has occurred. The magnetic field for recordation cannot suffer from a mild rise. The rapid rise of the magnetic field can be kept. The magnetic field of a sufficient intensity can be generated in a moment. Magnetization of a sufficient intensity can thus be established on the magnetic recording disk 13 even when the frequency of a signal for recordation gets higher. An improvement can be expected in the recording density of the magnetic recording disk 13.

Figure 6:
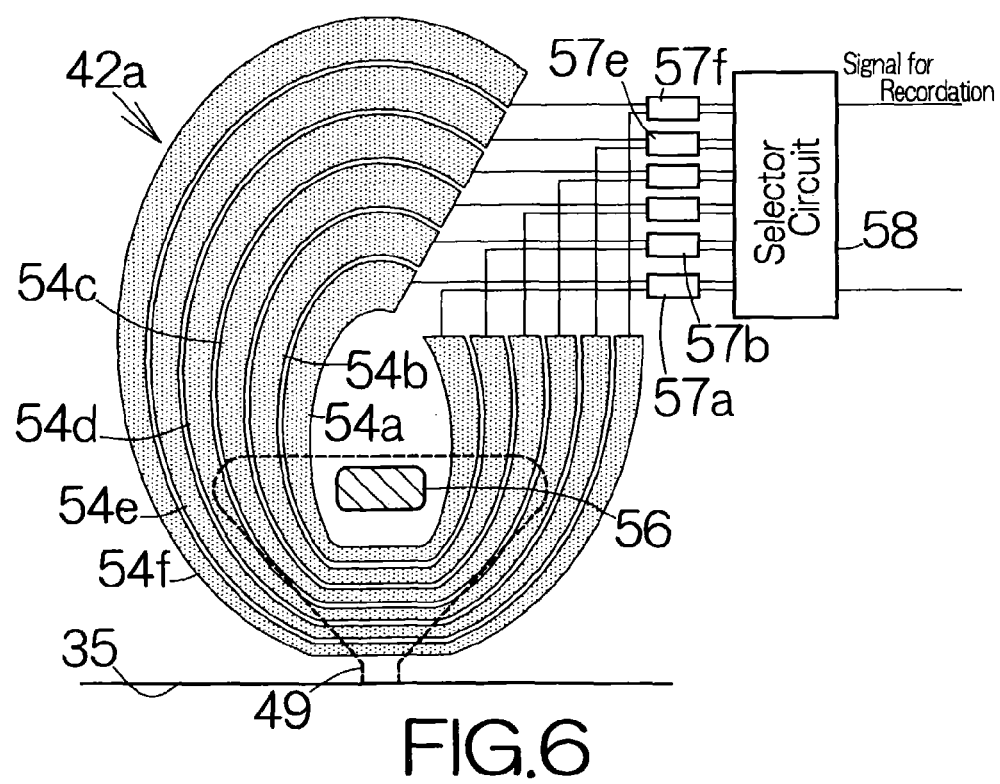
FIG. 6 is an enlarged plan view, equivalent to FIG. 5, schematically illustrating the structure of a thin film magnetic head according to a second embodiment of the present invention.

FIG. 6 schematically illustrates the structure of a thin film magnetic head 42a according to a second embodiment of the present invention. A selector circuit 58 is commonly connected to the current supplying circuits 57a, 57b, . . . , in the second embodiment. The selector circuit 58 is designed to supply an instruction signal for recordation to the individual current supplying circuits 57a, 57b, . . . . Here, the selector circuit 58 selectively supplies the current supplying circuits 57a, 57b, . . . , with the instruction signal for recordation. The electric current for recordation is selectively supplied to the thin film coils 54a, 54b, . . . . Like reference numerals are attached to the structure or component equivalent to those of the aforementioned first embodiment.

In general, the intensity of the magnetic flux generated within the magnetic core depends upon the space between the magnetic core and the thin film coils 54a, 54b, . . . . The thin film coil 54a, 54b, . . . , closer to the magnetic piece 56 acts on the magnetic piece 56 in a stronger manner. If the electric current for recordation can selectively be supplied to the thin film coils 54a, 54b, . . . , the intensity of the magnetic flux can be adjusted as expected within the magnetic core. This adjustment may be effected in accordance with the specification of the HDD 11, the required performance of the thin film magnetic head 42a, or the like.

In addition, the thin film coil 54a, 54b, . . . , remoter from the magnetic piece 56 will suffer from a larger overall length of the conductive pattern. It is presumed that the thin film coils 54a, 54b, . . . , suffer from a time lag in the rise of the magnetic field for recordation. The thin film coil 54a, 54b, . . . , remoter from the magnetic piece 56 may suffer from a relatively mild rise of the magnetic field for recordation. If the electric current for recordation can selectively be supplied to the thin film coils 54a, 54b, . . . , the rise of the magnetic flux can be adjusted as expected within the magnetic core. This adjustment may be effected in accordance with the specification of the HDD 11, the required performance of the thin film magnetic head 42a, or the like.

Figure 7:
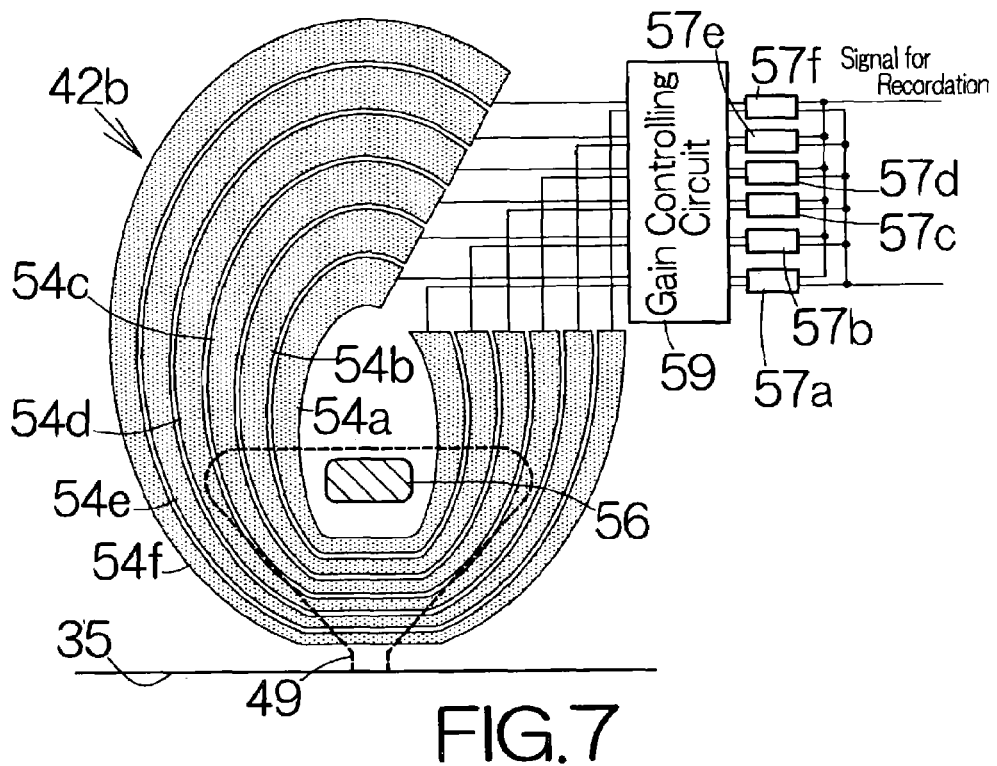
FIG. 7 is an enlarged plan view, equivalent to FIG. 5, schematically illustrating the structure of a thin film magnetic head according to a third embodiment of the present invention.

FIG. 7 schematically illustrates the structure of a thin film magnetic head 42b according to a third embodiment of the present invention. A gain controlling circuit 59, serving as a current value controlling circuit, is commonly connected to the current supplying circuits 57a, 57b, . . . , in the third embodiment. The electric currents for recordation from the individual current supplying circuits 57a, 57b, . . . , are supplied to the gain controlling circuit 59. The gain controlling circuit 59 is designed to adjust the current values of the individual electric currents for recordation. The thus adjusted electric currents for recordation are then supplied to the thin film coils 54a, 54b, . . . . If the value of the electric current for recordation can individually be set for the thin film coils 54a, 54b, . . . , in this manner, the intensity of the magnetic field generated at the individual thin film coil 54a, 54b, . . . , can be adjusted as expected. Like reference numerals are attached to the structure or component equivalent to those of the aforementioned first embodiment.

Figure 8:
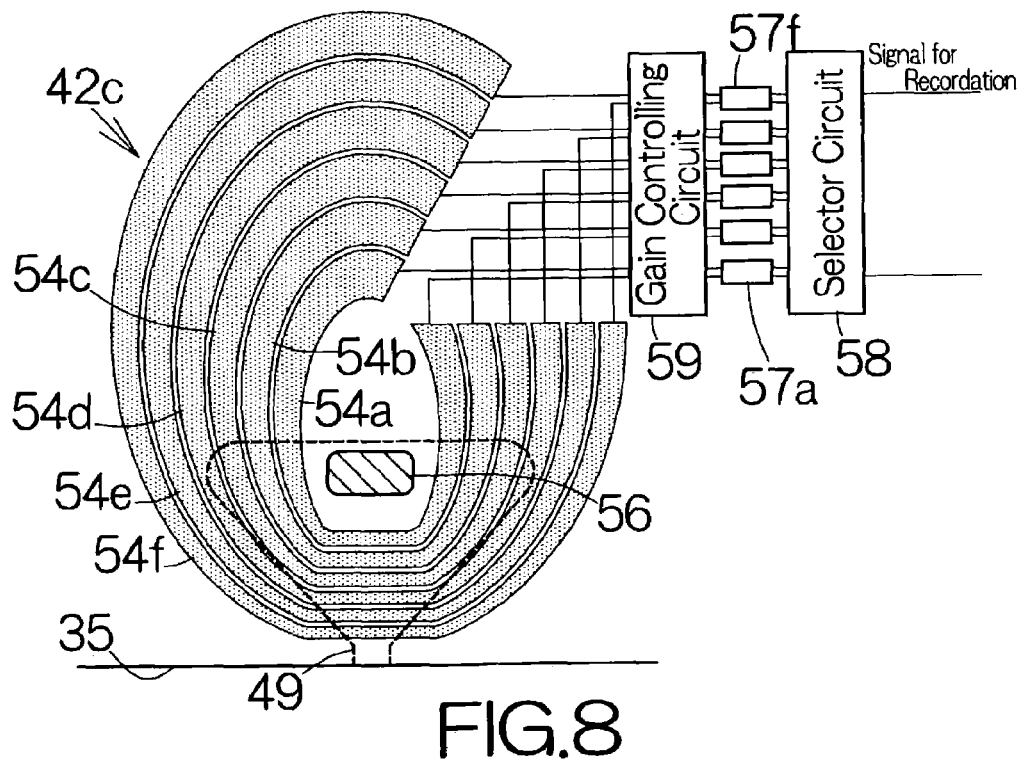
FIG. 8 is an enlarged plan view, equivalent to FIG. 5, schematically illustrating the structure of a thin film magnetic head according to a fourth embodiment of the present invention.

FIG. 8 schematically illustrates the structure of a thin film magnetic head 42c according to a fourth embodiment of the present invention. The aforementioned selector circuit 58 and gain controlling circuit 59 are both connected to the current supplying circuits 57a, 57b, . . . , in the fourth embodiment. Accordingly, the intensity of the magnetic field as well as the timing of the rise of the magnetic field can be adjusted as expected in the thin film coils 54a, 54b, . . . , at a higher accuracy. Like reference numerals are attached to the structure or component equivalent to those of the aforementioned first and second embodiments.

Figure 9:
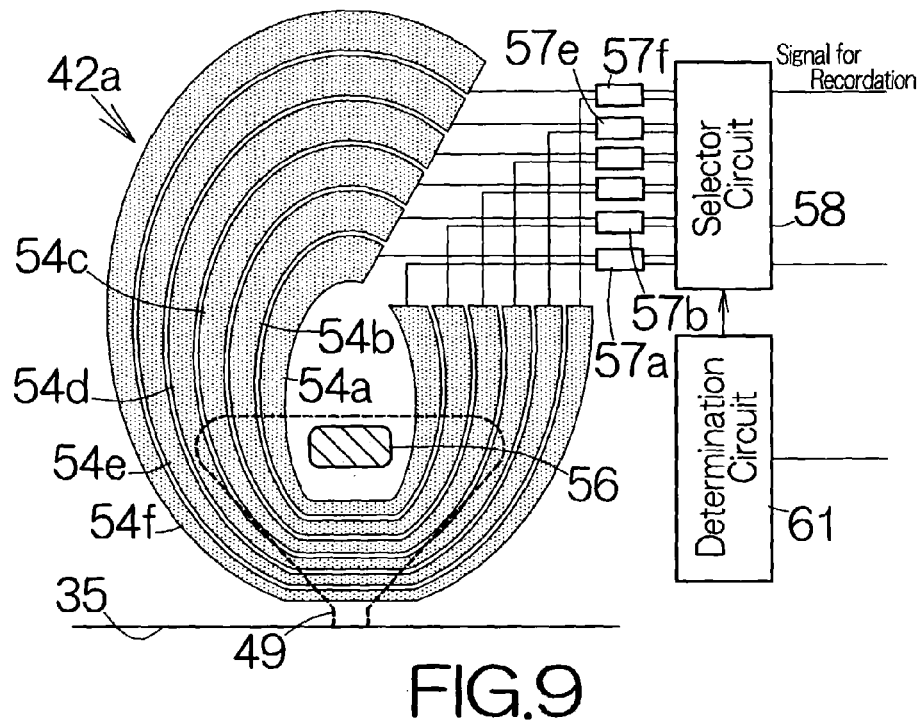
FIG. 9 is an enlarged plan view, equivalent to FIG. 5, schematically illustrating the structure of a thin film magnetic head according to a modification of the second embodiment.
Figure 10:
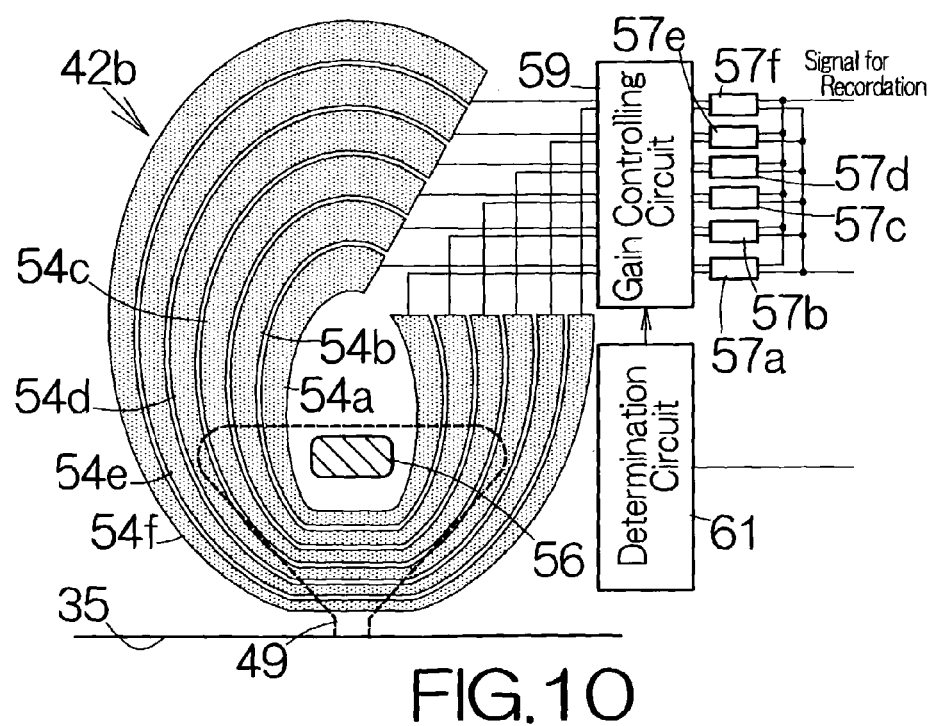
FIG. 10 an enlarged plan view, equivalent to FIG. 5, schematically illustrating the structure of a thin film magnetic head according to a modification of the third embodiment.
Figure 11:
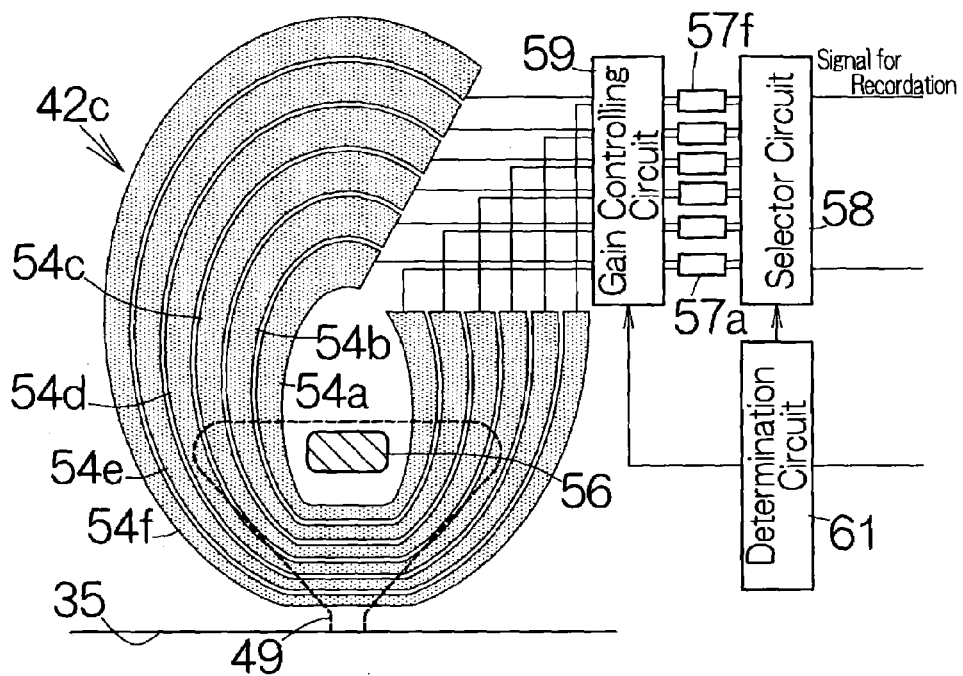
FIG. 11 an enlarged plan view, equivalent to FIG. 5, schematically illustrating the structure of a thin film magnetic head according to a modification of the fourth embodiment.
Figure 12:
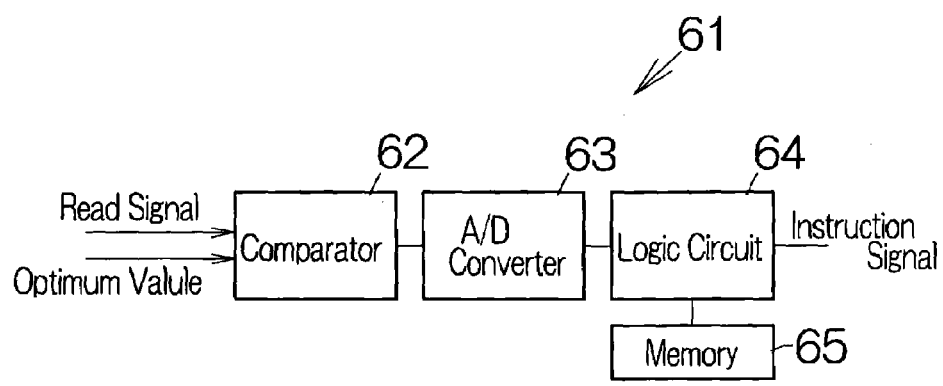
FIG. 12 is a block diagram illustrating the structure of a determination circuit of a specific example.

As shown in FIGS. 9 to 11, a determination circuit 61 may be connected to the selector circuit 58 and the gain controlling circuit 59 in the aforementioned second, third and fourth embodiments, for example. The determination circuit 61 may be designed to supply the selector circuit 58 with an instruction signal identifying a selected one or selected ones of the current supplying circuits 57a, 57b, . . . , based on the read signal reproduced at the read head element 41, for example. The determination circuit 61 may also be designed to instruct the gain controlling circuit 59 to set the current value based on the read signal reproduced at the read head element 41. The intensity of the magnetic field as well as the timing of the rise of the magnetic field can thus be adjusted as expected in the thin film coils 54a, 54b, . . . , at a still higher accuracy based on the output level of the read signal. Like reference numerals are attached to the structure or component equivalent to those of the aforementioned first to fourth embodiments As shown in FIG. 12, the determination circuit 61 includes a comparator 62 designed to compare the amplitude and/or the half-width of the read signal with a predetermined optimum value, for example. An analog/digital (A/D) converter 63 is connected to the comparator 62. An arithmetic or logic circuit 64 is connected to the A/D converter 63. A memory 65 is connected to the logic circuit 64. The comparator 62 is designed to output a difference signal identifying the difference between the value of the read signal and the optimum value. The analog difference signal is converted into a digital signal at the A/D converter 63. The logic circuit 64 read a predetermined set value out of the memory 65 based on the resultant digital signal. The predetermined set value can be utilized to se the selector circuit 58 as well as the gain controlling circuit 59.

Figure 13:
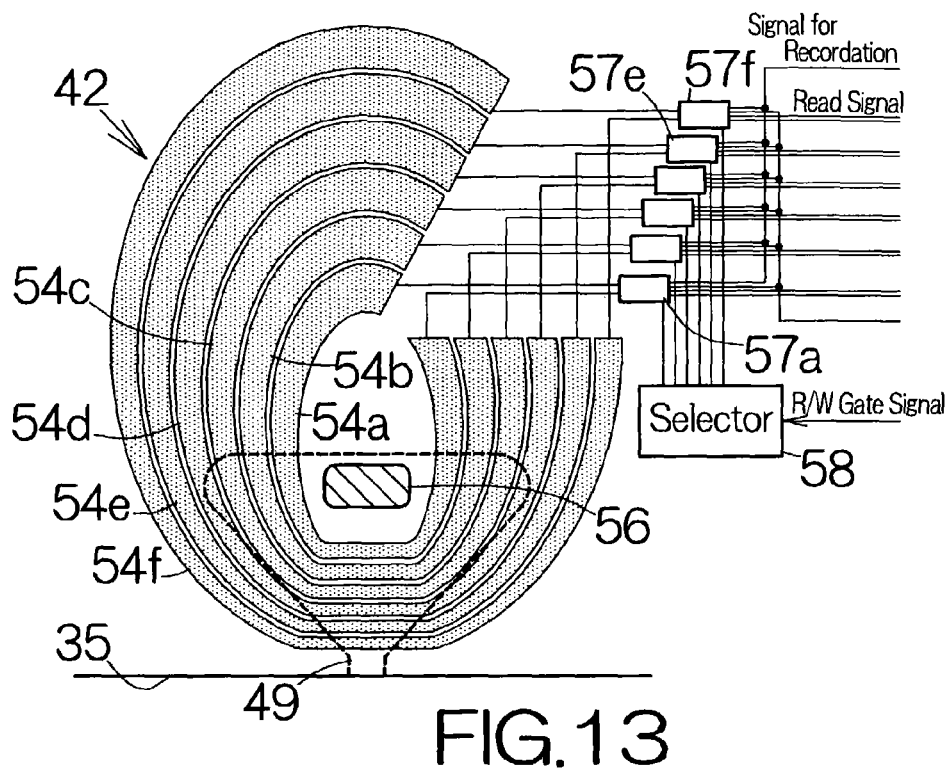
FIG. 13 is an enlarged plan view, equivalent to FIG. 5, schematically illustrating the structure of a thin film magnetic head according to a modified embodiment.
Figure 14:
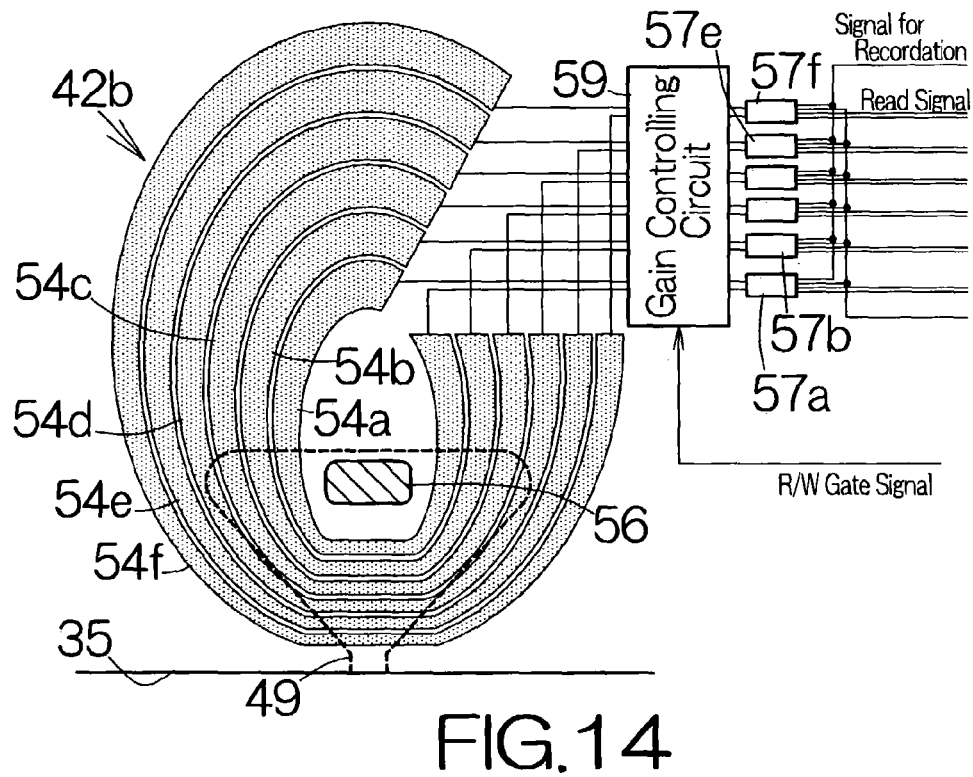
FIG. 14 is an enlarged plan view, equivalent to FIG. 5, schematically illustrating the structure of a thin film magnetic head according to another modified embodiment.

As shown in FIGS. 13 and 14, the thin film magnetic head 42, 42a, 42b, 42c may also be utilized to read binary data out of the magnetic recording disk 13. In this case, the selector circuit 58 serves to distinguish the selected one or ones of the thin film coils 54a, 54b, . . . , for the read operation from the selected one or ones of the thin film coils 54a, 54b, . . . , for the aforementioned write operation. Otherwise, the gain controlling circuit 59 may serve to adjust the output level of the read signal.

What is claimed is:

1. A thin film magnetic head comprising:
   coils winding around a magnetic core;
   one or more current supplying circuits connected to the coils so as to supply the coils with an electric current for recordation, each one of the coils being connected to a corresponding one of the current supplying circuits;
   a selector circuit commonly connected to the current supplying circuits, said selector circuit designed to selectively supply at least one of the current supplying circuits with data signals; and
   a determination circuit connected to the selector circuit, said determination circuit designed to supply the selector circuit with an instruction signal identifying a selected one or selected ones of the current supplying circuits based on a read signal read out of a recording medium.

2. A thin film magnetic head comprising:
   coils winding around a magnetic core;
   one or more current supplying circuits connected to the coils so as to supply the coils with an electric current for recordation;
   a current value controlling circuit is connected to the current supplying circuits, said current value controlling circuit designed to adjust current value of the electric current that is actually supplied to said coils for recordation; and
   a determination circuit connected to the current value controlling circuit, said determination circuit designed to instruct the current value controlling circuit to set the current value based on a read signal read out of a recording medium.

3. The thin film magnetic head according to claim 2, further comprising:
   a selector circuit commonly connected to the current supplying circuits, said selector circuit designed to selectively supply at least one of the current supplying circuits with data signals,
   wherein the determination circuit is connected to the selector circuit, and said determination circuit is designed to supply the selector circuit with an instruction signal identifying a selected one or selected ones of the current supplying circuits based on the read signal.

4. The thin film magnetic head according to claim 2, wherein each one of the coils is connected to a corresponding one of the current supplying circuits.

5. The thin film magnetic head according to claim 4, further comprising a selector circuit commonly connected to the current supplying circuits, said selector circuit designed to selectively supply at least one of the current supplying circuits with data signals.

6. The thin film magnetic head according to claim 5, wherein said determination circuit is connected to the selector circuit, said determination circuit being designed to supply the selector circuit with an instruction signal identifying a selected one or selected ones of the current supplying circuits based on the read signal.

7. A magnetic recording device comprising:
   a magnetic recording medium;
   a head slider facing the magnetic recording medium;
   coils mounted on the head slider, said coils winding around a magnetic core;
   one or more current supplying circuits connected to the coils so as to supply the coils with an electric current for recordation, each one of the coils being connected to a corresponding one of the current supplying circuits;
   a selector circuit commonly connected to the current supplying circuits; said
   selector circuit designed to selectively supply at least one of the current supplying circuits with data signals; and
   a determination circuit connected to the selector circuit, said determination circuit designed to supply the selector circuit with an instruction signal identifying a selected one or selected ones of the current supplying circuits based on a read signal read out of the magnetic recording medium.

8. A magnetic recording device comprising:
   a magnetic recording medium;
   a head slider facing the magnetic recording medium;
   coils mounted on the head slider, said coils winding around a magnetic core;
   one or more current supplying circuits connected to the coils so as to supply the coils with an electric current for recordation;
   a current value controlling circuit is connected to the current supplying circuits, said current value controlling circuit designed to adjust current value of the electric current that is actually supplied to said coils for recordation; and
   a determination circuit connected to the current value controlling circuit, said determination circuit designed to instruct the current value controlling circuit to set the current value based on a read signal read out of the magnetic recording medium.

9. The magnetic recording device according to claim 8, further comprising:
   a selector circuit commonly connected to the current supplying circuits, said selector circuit designed to selectively supply at least one of the current supplying circuits with data signals,
   wherein the determination circuit is connected to the selector circuit, and said determination circuit is designed to supply the selector circuit with an instruction signal identifying a selected one or selected ones of the current supplying circuits based on the read signal.

10. The magnetic recording device according to claim 8, wherein each one of the coils is connected to a corresponding one of the current supplying circuits.

11. The magnetic recording device according to claim 10, further comprising a selector circuit commonly connected to the current supplying circuits, said selector circuit designed to selectively supply at least one of the current supplying circuits with data signals.

12. The magnetic recording device according to claim 11, wherein said determination circuit is connected to the selector circuit, said determination circuit being designed to supply the selector circuit with an instruction signal identifying a selected one or selected ones of the current supplying circuits based on the read signal.

* * * * *